US012406640B1

(12) United States Patent
Huskey

(10) Patent No.: US 12,406,640 B1
(45) Date of Patent: Sep. 2, 2025

(54) PLECTRUM WITH ASYMMETRIC PROTUBERANCES

(71) Applicant: Richard Cevin Huskey, St. Louis, MO (US)

(72) Inventor: Richard Cevin Huskey, St. Louis, MO (US)

( * ) Notice: Subject to any disclaimer, the term of this patent is extended or adjusted under 35 U.S.C. 154(b) by 0 days.

(21) Appl. No.: 19/067,024

(22) Filed: Feb. 28, 2025

(51) Int. Cl.
*G10D 3/173* (2020.01)

(52) U.S. Cl.
CPC .................................... *G10D 3/173* (2020.02)

(58) Field of Classification Search
CPC ...................................................... G10D 3/173
See application file for complete search history.

(56) References Cited

U.S. PATENT DOCUMENTS

| | | | | |
|---|---|---|---|---|
| 2,484,820 A * | 10/1949 | Galetzky | G10D 3/173 | 84/322 |
| D260,529 S | 9/1981 | Pearse | | |
| 6,777,602 B2 * | 8/2004 | Hautamaki | G10D 3/173 | 84/322 |
| 7,238,869 B1 * | 7/2007 | Kleczkza | G10D 3/173 | 84/322 |
| 7,462,768 B2 * | 12/2008 | Newmaster | G10D 3/173 | 84/322 |
| 8,178,767 B1 * | 5/2012 | King | G10D 3/173 | 84/322 |
| 8,642,864 B2 * | 2/2014 | Bordelon | G10D 3/173 | 84/322 |
| 8,664,498 B2 | 3/2014 | Leneman | | |
| 9,691,365 B2 | 6/2017 | Pascale | | |
| 11,721,311 B1 * | 8/2023 | Brown, Sr. | G10D 3/173 | 84/322 |
| D1,033,527 S | 7/2024 | Winter | | |
| 12,283,261 B1 * | 4/2025 | McBride | G10D 3/173 | |
| 2003/0106410 A1 * | 6/2003 | Hautamaki | G10D 3/173 | 84/322 |
| 2013/0092008 A1 * | 4/2013 | Murphy | G10D 3/173 | 84/322 |
| 2023/0260485 A1 * | 8/2023 | Brown, Sr. | G10D 3/173 | 84/322 |

* cited by examiner

*Primary Examiner* — Robert W Horn
(74) *Attorney, Agent, or Firm* — Carmody MacDonald P.C.; Dennis JM Donahue, III; Kevin C. Staed

(57) ABSTRACT

A plectrum for a musical instrument with strings has four (4) protuberances that extend outwardly from a center body. The protuberances are asymmetric relative to both the central longitudinal axis and the central lateral axis and have different sizes along with variations in their shapes. Each protuberance has a rounded tip with a single convex sidewall section. On either side of the rounded tip, each protuberance has straight sidewall sections. Concave sidewall sections extend between the straight sidewall sections in adjacent pairs of protuberances.

20 Claims, 2 Drawing Sheets

PLECTRUM WITH ASYMMETRIC PROTUBERANCES

CROSS-REFERENCE TO RELATED APPLICATIONS

This application is an original filing of the invention as a non-provisional utility patent application and does not claim a right of priority to any other application or the benefit of an earlier filing date.

STATEMENT REGARDING FEDERALLY SPONSORED RESEARCH

Not Applicable.

APPENDIX

Not Applicable.

BACKGROUND OF THE INVENTION

Field of the Invention

The present invention generally relates to a plectrum that is used to pick, pluck, or strum the strings of a musical instrument, and more particularly, to a plectrum that has longitudinal and lateral protuberances which have different sizes and shapes and are asymmetrically situated around the plectrum.

Related Art

There are a number of plectrums which have multiple tips which are formed at the end of protuberances. Some plectrums have identically shaped protuberances and tips with different thicknesses, such as described in U.S. Pat. No. 6,777,602. Other plectrums have equally spaced protuberances which have different numbers of peaks at the tips, such as described in U.S. Pat. No. 7,462,768. However, these prior art plectrums are hard to hold and cumbersome. They are designed primarily to produce different sounds and to allow for different ways to strike the musical instrument's strings. They are not designed to comfortably and securely be held in by the musician. Accordingly, there remains a need for an improved plectrum that has multiple protuberances which can be comfortably and securely gripped within a person's hand. It would also be beneficial for the improved plectrum to have differently sized protuberances and varying shapes of the tips to allow for different styles of playing the musical instrument, such as picking, plucking, and strumming.

SUMMARY OF THE INVENTION

In one aspect of the invention, a plectrum has a center body with four (4) protuberances that each have a single rounded tip and are asymmetric about both a longitudinal axis and a lateral axis.

In another aspect of the invention, the plectrum's largest protuberance has an area that is more than twice the size of the smallest protuberance, and the longest side of the plectrum's largest protuberance is more than twice as long as the shortest side of the plectrum's smallest protuberance.

In yet another aspect of the invention, the rounded tip in the plectrum's largest protuberance has the smallest radius of curvature of all the rounded tips.

In still another aspect of the invention, the largest radius of curvature of all the rounded tips is less than or equal to the radius of curvature for the concave sidewall sections between the protuberances.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
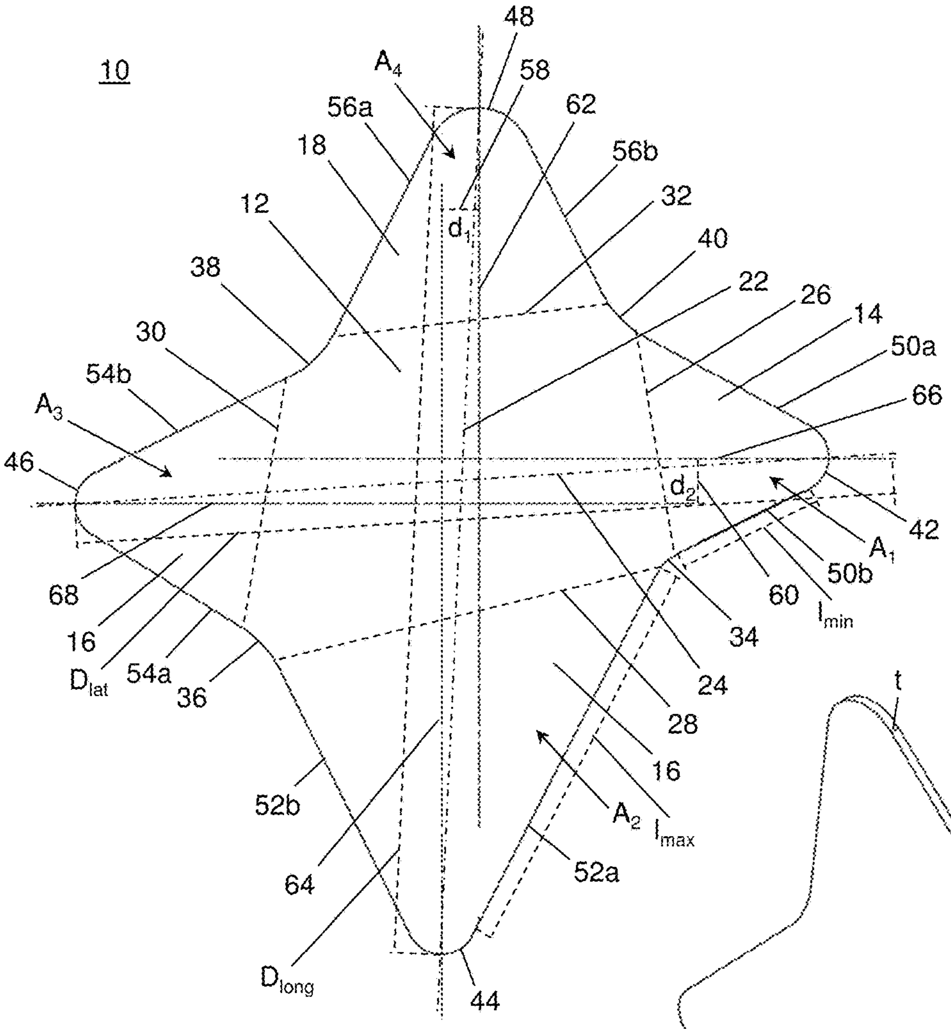
FIG. 1 is a plan view of a plectrum according to the present invention.
Figure 2:
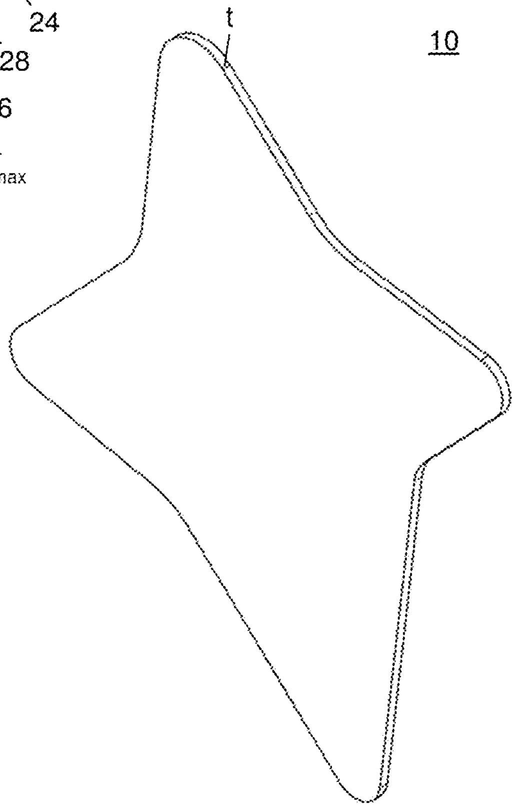
FIG. 2 is a perspective view of the plectrum shown in FIG. 1.

As generally shown in FIGS. 1 and 2, a plectrum 10 for a musical instrument with strings has a center body 12 with four (4) protuberances 14, 16, 18, 20 that are asymmetric relative to both the central longitudinal axis 22 and the central lateral axis 24 and which have different sizes along with variations in their shapes. Each protuberance has a pair of straight sidewall sections 50*a*-50*b*, 52*a*-52*b*, 54*a*-54*b*, 56*a*-56*b* that bound corresponding rounded tips 42, 44, 46, 48, each of which forms a single convex sidewall section. Concave sidewall sections 34, 36, 38, 40 are situated between the straight sidewall sections in adjacent protuberances, and they form the boundaries of the center body's sides 26, 28, 30, 32 from which the protuberances extend. The center body and the protuberances are preferably planar with a flat front face and a flat back face with a thickness (t) that is equivalent to standard plectrums. The varying size and shapes of the protuberances and their asymmetric arrangement around the center body provide a comfortable and secure grip within a musician's hand.

As indicated above, the protuberances preferably have different sizes that encompass a range of areas ($A_1$, $A_2$, $A_3$, $A_4$). In the most extreme size differential, the largest protuberance 16 has an area ($A_2$) that is more than twice the area ($A_1$) of the smallest protuberance 42, i.e. $A_2>2*A_1$. The largest protuberance also has the longest straight sidewall section 52*a* which has a length ($l_{max}$) that is more than twice the length ($l_{min}$) of the shortest straight sidewall section 50*b*, i.e., $l_{max}>2*l_{min}$, which is in the smallest protuberance, and the longest straight sidewall section is preferably adjacent to the shortest straight sidewall section. The longitudinal distance between the tips of the largest protuberance and the protuberance on the opposite side of the central body is larger than the lateral distance between the tips of the smallest protuberance and the protuberance on the opposite side of the central body ($D_{long}>D_{lat}$).

The unique asymmetry of the plectrum is created by offsets 58, 60 between the protuberances on opposite sides of the center body. In particular, the axes 62, 64 that bisect the angles between the straight sidewall sections in the longitudinally extending protuberances are parallel to and offset from each other by a distance ($d_1$) that is preferably greater than the thickness of the plectrum. Similarly, the axes 66, 68 that bisect the angles between the straight sidewall sections in the laterally extending protuberances are parallel to and offset from each other by another distance ($d_2$) that is preferably greater than the distance between the offset in the longitudinally extending protuberances. The longitudinally extending bisecting axes 62, 64 are perpendicular to the laterally extending bisecting axes 66, 68 while the longitudinal axis and the lateral axis are not perpendicular to each other. The offset distances ($d_1$, $d_2$) between the bisecting axes are preferably greater than the smallest radius of curvature for the rounded tips and less than the largest diameter for the rounded tips which are described in more detail below.

Figure 3:
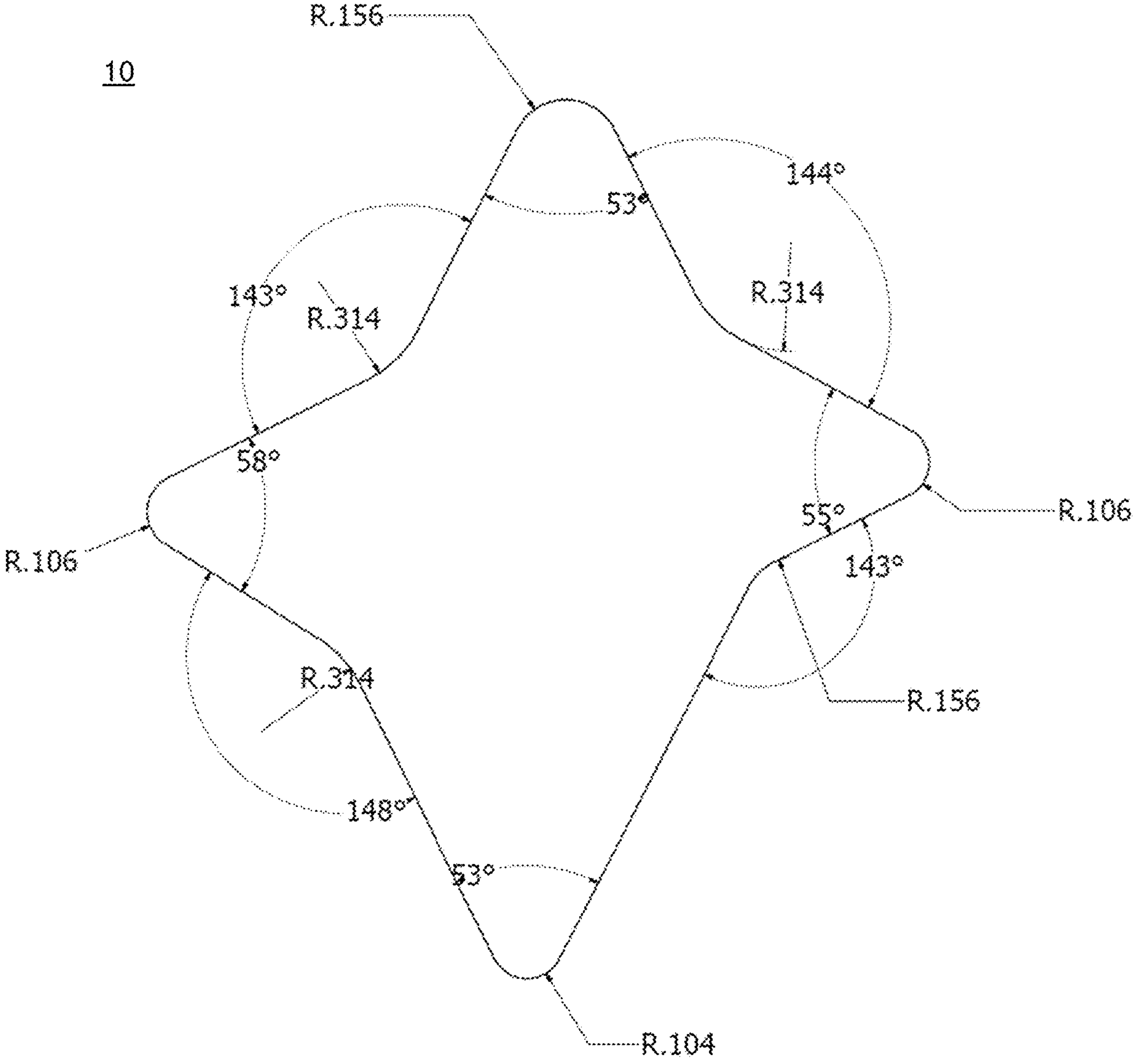
FIG. 3 is a plan view of the plectrum shown in FIG. 1 and displays the angles and radii of curvature.

As particularly shown in FIG. 3, the largest protuberance's rounded tip 44 has the smallest radius of curvature (0.104"). The rounded tip 44 with the largest radius of curvature (0.156") is preferably on the protuberance on the opposite side of the center body from the largest protuberance. Accordingly, the smallest protuberance preferably has the largest radius of curvature, and the rounded tips for the laterally extending protuberances each have a radius of curvature that are greater than the largest protuberance's rounded tip and less than the smallest protuberance's rounded tip. The laterally extending protuberances' rounded tips preferably have a radius of curvature that is slightly greater than the smallest radius of curvature and could have the same radius of curvature (0.106"). The different shapes of the tips allow for different styles of playing the musical instrument. For example, the rounded tip with the smallest radius of curvature could be used for faster picking of the strings while the more rounded tips could be used for strumming the strings. It will also be appreciated that the plectrum could be held in a musician's hand with two (2) picking surfaces extending outward to strum the strings of the musical instrument, and this dual tip orientation would produce another sound that differs from each one of the single tip orientations.

As also shown in FIG. 3, the interior angles between the straight sidewall sections in the protuberances are greater than 45° and less than 60°. The widest interior angles are in the laterally extending protuberances (55°, 58°), and the longitudinally extending protuberances preferably have the same interior angle (53°). It will be appreciated that with the small differences in the interior angles, i.e., 5° being the maximum difference from narrowest interior angle to the widest interior angle, there is a similarly small difference in the exterior angles between the straight line segments of adjacent protuberances (144°, 143°, 148°, 143°). The relatively small differences in the wide exterior angles combined with the asymmetry in the protuberances help provide the comfortable and secure grip.

It will be appreciated that the straight sidewall sections could have a slight convex shape that is similar to standard plectrums and are preferably not concave. Accordingly, the straight sidewall sections can generally be referred to as non-concave sidewall sections. Each one of the concave sidewall sections has a radius of curvature (0.314", 0.314", 0.314", 0.156") that is greater than or equal to the largest radius of curvature for the rounded tips. Preferably, the center body and the protuberances all have the same thickness.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, the different protuberances could have different thicknesses or the center body could be slightly thicker than the protuberances, although these are not the preferred embodiment. Thus, the breadth and scope of the present invention should not be limited by any of the above-described exemplary embodiments but should be defined only in accordance with the following claims appended hereto and their equivalents.

What is claimed is:

1. A plectrum for a musical instrument with strings, comprising:

a center body comprising a first side extending between a first pair of concave sidewall sections, a second side extending between a second pair of concave sidewall sections, a third side extending between a third pair of concave sidewall sections, and a fourth side extending between a fourth pair of concave sidewall sections;

a first protuberance extending from the first side of the center body, wherein the first protuberance comprises a first area and a first rounded tip between a first pair of non-concave sidewall sections;

a second protuberance extending from the second side of the center body, wherein the second protuberance comprises a second area and a second rounded tip between a second pair of non-concave sidewall sections, and wherein the second area is more than twice as great as the first area;

a third protuberance extending from the third side of the center body, wherein the third protuberance comprises a third area and a third rounded tip between a third pair of non-concave sidewall sections, and wherein the third area is greater than the first area; and a fourth protuberance extending from the fourth side of the center body, wherein the fourth protuberance comprises a fourth area and a fourth rounded tip between a fourth pair of non-concave sidewall sections, and wherein the fourth area is greater than the first area.

2. The plectrum of claim 1, wherein the first rounded tip, the second rounded tip, the third rounded tip, and the fourth rounded tip are each comprised of a single convex sidewall section between the corresponding pairs of non-concave sidewall sections.

3. The plectrum of claim 2, wherein the second rounded tip has a smaller radius of curvature than a radius of curvature for each of the first rounded tip, the third rounded tip, and the fourth rounded tip.

4. The plectrum of claim 2, wherein the first rounded tip and the third rounded tip are on opposite lateral sides of the center body, wherein the second rounded tip and the fourth rounded tip are on opposite longitudinal sides of the center body, and wherein the fourth rounded tip comprises a larger radius of curvature than the first rounded tip and the third rounded tip.

5. The plectrum of claim 2, wherein the radius of curvature for each one of the concave sidewall sections is greater than or equal to a largest radius of curvature for the rounded tips.

6. The plectrum of claim 1, wherein the pairs of non-concave sidewall sections are pairs of straight sidewall sections.

7. The plectrum of claim 6, wherein the longest straight sidewall section is more than twice the length of the shortest straight sidewall section.

8. The plectrum of claim 7, wherein the longest straight sidewall section is in the second protuberance, wherein the shortest straight sidewall section is in the first protuberance, wherein the longest straight sidewall section is adjacent to the shortest straight sidewall section, wherein each one of the rounded tips individually extend toward and strike the strings of the musical instrument in a single tip orientation, and wherein the rounded tips in a pair of adjacent protuberances simultaneously strike the strings of the musical instrument in a dual tip orientation.

9. The plectrum of claim 6, wherein the first rounded tip and the third rounded tip are on opposite sides of the center body from each other and are each comprised of a single convex sidewall section between the straight sidewall sections, wherein a first axis bisects a first interior angle of the first protuberance, wherein a second axis bisects a second interior angle of the second protuberance, wherein a third axis bisects a third interior angle of the third protuberance, wherein a fourth axis bisects a fourth interior angle of the fourth protuberance, and wherein the first axis and the third axis are substantially parallel and are offset by a distance greater than a smallest radius of curvature for the rounded tips and less than a largest diameter for the rounded tips.

10. The plectrum of claim 9, wherein the second rounded tip and the fourth rounded tip are on opposite sides of the center body from each other and are each comprised of the single convex sidewall section between the straight sidewall sections, and wherein the second axis and the fourth axis are substantially parallel and are offset by another distance greater than the smallest radius of curvature for the rounded tips and less than the largest diameter for the rounded tips.

11. A plectrum for a musical instrument with strings, comprising:

a center body;

a first protuberance extending from a first side of the center body, wherein the first protuberance comprises a first area and a first rounded tip between a first pair of non-concave sidewall sections;

a second protuberance extending from a second side of the center body, wherein the second protuberance comprises a second area and a second rounded tip between a second pair of non-concave sidewall sections, and wherein the second area is more than twice as great as the first area;

a third protuberance extending from a third side of the center body, wherein the third protuberance comprises a third area and a third rounded tip between a third pair of non-concave sidewall sections, and wherein the third area is greater than the first area;

a fourth protuberance extending from a fourth side of the center body, wherein the fourth protuberance comprises a fourth area and a fourth rounded tip between a fourth pair of non-concave sidewall sections, and wherein the fourth area is greater than the first area; and wherein the first rounded tip, the second rounded tip, the third rounded tip, and the fourth rounded tip are each comprised of a single convex sidewall section between the corresponding pairs of non-concave sidewall sections, and wherein the second rounded tip has a smaller radius of curvature than a radius of curvature for each of the first rounded tip, the third rounded tip, and the fourth rounded tip.

12. The plectrum of claim 11, wherein the pairs of non-concave sidewall sections are pairs of straight sidewall sections, and wherein the center body is further comprised of a first concave sidewall section extending between the first protuberance and the fourth protuberance, a second concave sidewall section extending the second protuberance and the first protuberance, a third concave sidewall section extending the third protuberance and the second protuberance, and a fourth concave sidewall section extending between the fourth protuberance and the third protuberance.

13. The plectrum of claim 12, wherein the longest straight sidewall section is in the second protuberance, wherein the shortest straight sidewall section is in the first protuberance, and wherein the longest straight sidewall section is more than twice the length of the shortest straight sidewall section.

14. The plectrum of claim 11, wherein the first rounded tip and the third rounded tip are on opposite sides of the center body from each other and are each comprised of a single convex sidewall section between the non-concave sidewall sections, wherein a first axis bisects a first interior angle of the first protuberance, wherein a second axis bisects a second interior angle of the second protuberance, wherein a third axis bisects a third interior angle of the third protuberance, wherein a fourth axis bisects a fourth interior angle of the fourth protuberance, and wherein the first axis and the third axis are substantially parallel and are offset by a distance greater than a smallest radius of curvature for the rounded tips and less than a largest diameter for the rounded tips.

15. The plectrum of claim 14, wherein the second rounded tip and the fourth rounded tip are on opposite sides of the center body from each other and are each comprised of the single convex sidewall section between the non-concave sidewall sections, and wherein the second axis and the fourth axis are substantially parallel and are offset by another distance greater than the smallest radius of curvature for the rounded tips and less than the largest diameter for the rounded tips.

16. A plectrum for a musical instrument with strings, comprising:

a center body;

a first protuberance extending from a first side of the center body, wherein the first protuberance comprises a first convex tip extending between a first pair of non-concave sidewall sections;

a second protuberance extending from a second side of the center body, wherein the second protuberance comprises a second convex tip extending between a second pair of non-concave sidewall sections;

a third protuberance extending from a third side of the center body, wherein the third protuberance comprises a third convex tip extending between a third pair of non-concave sidewall sections;

a fourth protuberance extending from a fourth side of the center body, wherein the fourth protuberance comprises a fourth convex tip extending between a fourth pair of non-concave sidewall sections; and wherein the first convex tip and the third convex tip are on opposite sides of the center body from each other, wherein a first axis bisects a first interior angle of the first protuberance, wherein a second axis bisects a second interior angle of the second protuberance, wherein a third axis bisects a third interior angle of the third protuberance, wherein a fourth axis bisects a fourth interior angle of the fourth protuberance, and wherein the first axis and the third axis are substantially parallel and are offset by a distance greater than a smallest radius of curvature for the convex tips and less than a largest diameter for the convex tips.

17. The plectrum of claim 16, wherein the second convex tip and the fourth convex tip are on opposite sides of the center body from each other, and wherein the second axis and the fourth axis are substantially parallel and are offset by another distance greater than the smallest radius of curvature for the convex tips and less than the largest diameter for the convex tips.

18. The plectrum of claim 16, wherein the pairs of non-concave sidewall sections are pairs of straight sidewall sections, and wherein the center body is further comprised of a first concave sidewall section extending between the first protuberance and the fourth protuberance, a second concave sidewall section extending the second protuberance and the first protuberance, a third concave sidewall section extending the third protuberance and the second protuberance, and a fourth concave sidewall section extending between the fourth protuberance and the third protuberance.

19. The plectrum of claim 18, wherein the longest straight sidewall section is in the second protuberance, wherein the shortest straight sidewall section is in the first protuberance, and wherein the longest straight sidewall section is more than twice the length of the shortest straight sidewall section.

20. The plectrum of claim 16, wherein the first protuberance comprises a first area, wherein the second protuberance comprises a second area, and wherein the second area is more than twice as great as the first area, wherein the third protuberance comprises a third area, wherein the third area is greater than the first area, wherein the fourth protuberance comprises a fourth area, and wherein the fourth area is greater than the first area.

* * * * *